United States Patent [19]

Ansel et al.

[11] Patent Number: 4,496,210

[45] Date of Patent: Jan. 29, 1985

[54] LOW TEMPERATURE-FLEXIBLE RADIATION-CURABLE UNSATURATED POLYSILOXANE COATED FIBER OPTIC

[75] Inventors: Robert E. Ansel, Hoffman Estates; Orvid R. Cutler, Rolling Meadows; Elias P. Moschovis, Morton Grove, all of Ill.

[73] Assignee: DeSoto, Inc., Des Plaines, Ill.

[21] Appl. No.: 398,161

[22] Filed: Jul. 19, 1982

[51] Int. Cl.$^3$ .................. B05D 5/06; G02B 5/172
[52] U.S. Cl. .................. 350/96.3; 350/96.23; 204/159.13; 65/3.11; 65/3.41; 528/32; 428/429
[58] Field of Search ............ 204/159.13; 350/96.23, 350/96.30

[56] References Cited

U.S. PATENT DOCUMENTS

| | | | |
|---|---|---|---|
| 2,956,044 | 10/1960 | Merker | 526/279 |
| 3,650,811 | 3/1972 | Nordstrom et al. | 204/159.13 |
| 4,201,808 | 5/1980 | Cully et al. | 428/40 |
| 4,276,135 | 6/1981 | Sato et al. | 204/159.13 |
| 4,290,869 | 9/1981 | Pigeon | 204/159.13 |
| 4,293,397 | 10/1981 | Sato et al. | 528/33 |
| 4,293,678 | 10/1981 | Carter et al. | 204/159.13 |
| 4,348,454 | 9/1982 | Eckberg | 204/159.13 |
| 4,351,657 | 9/1982 | Kimura et al. | 427/163 |
| 4,359,369 | 11/1982 | Takamizawa et al. | 204/159.13 |
| 4,367,918 | 1/1983 | Pinnow | 427/163 |
| 4,369,300 | 1/1983 | Carter et al. | 204/159.13 |

FOREIGN PATENT DOCUMENTS

| | | |
|---|---|---|
| 54-38393 | 3/1979 | Japan . |
| 1323869 | 7/1973 | United Kingdom . |

OTHER PUBLICATIONS

Derwent Abstract for Japanese Patent.

*Primary Examiner*—John C. Bleutge
*Assistant Examiner*—A. H. Koeckert
*Attorney, Agent, or Firm*—Dressler, Goldsmith, Shore, Sutker & Milnamow, Ltd.

[57] ABSTRACT

Optical fibers are coated with a radiation-curable liquid, polyethylenically unsaturated coating composition consisting essentially of an organic polysiloxane having from 2 to 6 reactive side chains each of which carry a functional group providing one reactive site which has been reached to provide a single radiation-curable monoethylenically unsaturated side chain. There are about one such side chain for every 500 to 5,000 units of molecular weight. This provides a prime coating which has a modulus of elasticity at room temperature and at $-60°$ C. below 3000.

18 Claims, No Drawings

LOW TEMPERATURE-FLEXIBLE RADIATION-CURABLE UNSATURATED POLYSILOXANE COATED FIBER OPTIC

DESCRIPTION

1. Technical Field

This invention relates to radiation-curable liquid coating compositions which cure to form coatings which maintain their flexibility at temperatures as low as about −40° C. to −60° C., and to optical glass fibers coated therewith.

2. Background Art

Radiation-curable liquid coating compositions are well known, and many of these involve diacrylate-terminated polyurethane oligomers. However, these known compositions may, under some conditions, be relatively hard when cured. In these cases, one can dilute the diacrylate-terminated polyurethane with a large proportion of radiation-curable monomer of low $T_g$ (glass transition temperature) so that radiation exposure will cure the coating and produce a soft layer instead of a hard one. However, these soft layers have little strength and, hence, are not useful for coating optical fibers.

In recent years, glass fiber has become important for the transmission of beams of light used for communication. These must be coated to protect the fiber surface against abrasion. The coating must also be able to resist microbending when the coated fiber is cabled and also when the coated fiber is subjected to large changes in temperature. These complex characteristics demand an unusual coating, namely, one which is both soft and tough. Moreover, this toughness must be achieved without introducing stiffness which would cause microbending when the coating contracts at low temperature. One effort to provide radiation-curable coatings having these properties is the subject of prior application Ser. No. 170,148, filed July 18, 1980, but there the properties begin to fall off when exceptionally low temperatures are encountered. It is desired to extend the range of low temperature which can be sustained without encountering unacceptable stiffness.

Early coatings for optical fibers included silicone oils, cellulosic lacquers, blocked urethanes, and RTV silicones. Most of these materials present problems in handling, stability, durability, or application speeds, factors that have been quite successfully corrected by the use of radiation-curable coatings, (preferably ultraviolet-curable coatings) such as those described in the said prior application. However, none of the earlier ultraviolet-cured coatings provided the level of low temperature (−40° C. to −60° C.) flexibility shown by the conventionally cured RTV silicones. This invention seeks to provide radiation-curable coatings (preferably ultraviolet-curable) having the desired low temperature flexibility performance, and which, at the same time, give an almost unlimited pot life at temperatures up to 80° C. RTV silicones have a short pot life at 80° C. so they are applied at lower temperature where the viscosity is higher and application more difficult. The RTV silicones do not cure with great rapidity, and this adversely limits the speed of production.

Description of Invention

In accordance with this invention, optical glass filament is prime coated with a liquid, polyethylenically unsaturated, radiation-curable resin constituted by an organic polysiloxane having from 2 to 6 reactive side chains each of which carry a functional group providing one reactive site which is preferably selected from the group consisting of hydroxyl, amine, mercaptan, carboxyl or glycidyl, and said functional group having been reacted to provide a single radiation-curable monoethylenically unsaturated side chain which preferably contains an acrylic or methacrylic group. Most preferably, the polysiloxane derivative is a polyacrylate or polymethacrylate, terms which are used here to identify a plurality of acrylic or methacrylic groups which are preferably present as ester groups.

The unique properties desired herein are obtained by having the described polysiloxane possess about one such monoethylenically unsaturated side chain for every 500 to 5,000 units of molecular weight.

The organic polysiloxanes used herein include known compounds which are available in commerce. The polysiloxane backbone is substituted with organic radicals, some of which are inert, and here methyl, phenyl, or a mixture thereof is preferred, and some of which are reactive, like hydroxy propyl or hydroxy polyoxypropyl, which illustrate the side chain providing the hydroxy functional group which is the preferred group providing a single reactive site in the previous description of the organic polysiloxane.

The reactive organic radical may be joined to the silicon atoms of the polysiloxane backbone through oxygen, but it is preferred to have it joined to the silicon atoms by a direct carbon to silicon bond. This is because the direct carbon to silicon bond is more resistant to hydrolysis. The prime coatings of this invention are soft and it is preferred to topcoat them. The topcoating supplies improved hydrolysis resistance as well as improved abrasion protection, so the use of a topcoat minimizes the significance of hydrolysis resistance just as it minimizes the importance of toughness in the prime coating. Nonetheless, when the prime coating is hydrolysis-resistant and when it possesses good toughness as well as having a low modulus of elasticity which is retained at low temperature, the best overall properties are obtained.

While the functional group providing the single reactive site can be supplied by any organic radical, aliphatic radicals are preferred, especially those which are saturated and which contain, except for the reactive functional group, only carbon and hydrogen, or carbon, hydrogen and oxygen. Thus, the preferred reactive side chains are saturated aliphatic hydrocarbon groups containing from two to four carbon atoms, especially 2-hydroxy propyl, and polyoxyalkylene ethers in which the alkylene group contains from two to four carbon atoms, such as hydroxy polyoxypropyl. Polyesters and polyether polyesters may be used in place of the more preferred polyethers noted above. A suitable polyester would be the reaction product of two moles of ethylene glycol or propylene glycol, with one mole of adipic acid or phthalic acid. This reaction product provides a diol which can be joined to the polysiloxane by one of its two hydroxy groups, leaving the other hydroxy group available to react with a compound which brings in the single ethylenically unsaturated group.

While aliphatic groups are preferred, the reactive side chain can be provided by an aromatic group such as the hydroxyethyl phenyl group.

If one were to use an hydroxy carboxylic acid, such as gamma hydroxybutyric acid, this could be joined to the polysiloxane by its hydroxy group, and then a single carboxyl group would be available to react with a compound which brings in the single ethylenically unsaturated group.

By starting with a polysiloxane containing a terminal carbinol group, this can be reacted with glycine (a carboxy amine) to provide, by direct esterification, a side chain having a primary amine group. While secondary amines are preferred because only one reactive functional site is provided, primary amines are effectively monofunctional when reacted with isocyanates, so they can be used and reacted with a monoethylenically unsaturated monoisocyanate, like the reaction product of 2-hydroxyethyl acrylate with 2,4-toluene diisocyanate or isophorone diisocyanate which contain one isocyanate group which is far more reactive than the other so that equimolar proportions of reactants will provide the desired monoisocyanate.

Mercaptan functionality is illustrated in the examples. It can also be provided by reacting a dithiol, like, 1,6-hexane dithiol or an hydroxy thiol, such as 1-hydroxy,6-thiol hexane with a silanol-terminated polysiloxane. Similarly, glycidyl functionality can be employed in the glycidoxy propyl since glycidoxy propyl-functional polysiloxanes are available in commerce. These can be reacted with acrylic acid to form a single acrylate ester group, the hydroxy group generated by the reaction being nonreactive under the conditions which enable ester formation with the glycidyl group.

It will now be evident that by a functional group providing a single reactive site we mean that it is feasible to react one site and not any other potentially reactive site. Nonetheless, it is preferred to employ a functional group which carries a single reactive hydrogen atom, like hydroxyl, carboxyl, mercaptan and secondary amine. These are desirably reacted with an acrylate or methacrylate carrying a single isocyanate group.

What is surprising is that the radiation-cured coatings of this invention in which the number of reactive side chains, the requirement that these be effectively monoreactive, and the spacing of the groups provided by the molecular weight per reactive group, are both soft and physically tough. These characteristics are not generally useful in coatings, but they provide useful prime coatings for the optical glass filament. These prime coatings possess a low modulus of elasticity which stays low at low temperatures. A room temperature modulus of 300 psi is typical in the present invention. At $-60°$ C. the modulus in a typical example increases to only about 1000. This is a very small increase in modulus for such a large reduction in temperature. This invention contemplates cured coatings which have a modulus of elasticity at room temperature and at $-60°$ C. which are below 3000, preferably below 2000. The preferred modulus at $-60°$ C. is between 400–1500.

One would think that the high cross-link density provided by radiation cure would produce a relatively high modulus which would be inconsistent with the needs of coated optical glass filament. To discover that the opposite is the fact when the polyacrylate or polymethacrylate is selected in accordance with this invention is something that would not have been foreseen.

One purpose of coating optical glass filament is to protect the surface of the filament before it might be abraded, and it is therefore preferred to apply the coating to the glass filament as it is initially formed. This is itself conventional.

As a matter of interest, the optical glass has the form of a continuous filament, but it is commonly referred to as a fiber, so these words are used interchangeably herein.

It is also preferred to overcoat the prime-coated filament of this invention to provide additional abrasion and/or hydrolysis protection, but this is also conventional, and the overcoats which may be used form no part of this invention.

It is desired to point out that the radiation used to provide the cure may be of diverse type, such as beta rays, electron beam and actinic radiation, but ultraviolet light is preferred because it is very rapid and does not significantly damage the optical glass filament. When ultraviolet light is to be used, the initiators and/or photosensitizers normally used for this purpose will be employed herein, such as about 3% by weight of diethoxy acetophenone. Since ultraviolet light is preferred, acrylic unsaturation is best, but since the radiation character can vary, so can the specific character of the unsaturation. Other useful ethylenic unsaturations are illustrated by itaconic, crotonic, allylic, vinylic, etc. These are in addition to the methacralic unsaturation, provided by reaction with methacrylic acid or 2-hydroxymethyl methacrylate, which has been noted previously. Itaconic or crotonic unsaturation may be introduced by using the corresponding acids in place of acrylic acid. Allylic unsaturation may be introduced using allyl alcohol in place of 2-hydroxyethyl acrylate. Vinylic unsaturation may be introduced using hydroxy butyl vinyl ether in place of 2-hydroxyethyl acrylate.

While it is preferred that the coating composition consist of the radiation-curable polysiloxane derivatives described herein, small amounts, up to about 15% of the total weight of the composition, but desirably no more than about 5% of the composition, may be constituted by other materials, such as dissolved resins, like melamine-formaldehyde condensates or unsaturated polyesters made from ethylene glycol, adipic acid and crotonic acid, radiation-curable monomers like 2-hydroxyethyl acrylate, or solvents like acetone. Since ultraviolet cure is preferred, liquid mono- or poly-acrylates may be added to adjust viscosity or for ancillary purpose. These are illustrated by phenoxy ethyl acrylate, 2-ethylhexyl acrylate, butyl acrylate, dodecyl acrylate, and the like. Other monoethylenic monomers, like vinyl pyrrolidone, diacetone acrylamide, isobutoxymethyl acrylamide, acrylamide, acrylic acid and dimethyl aminoethyl acrylate may be used.

The invention will be illustrated by the following example of preferred operation in which all proportions are by weight unless otherwise noted.

EXAMPLE 1

Into a reaction vessel fitted with a stirrer and gas inlet tube is placed one mole (222 gms) of isophorone diisocyanate. 0.2% by weight of dibutyl tin dilaurate and 0.05% by weight of phenothiazine, based on the total weight of reactants, are added to the reaction vessel. The mixture is then blanketed with dry nitrogen gas and one mole (116 gms) of hydroxy ethyl acrylate are added over a period of from 4 to 5 hours while maintaining the temperature in the range of 25° C. to 30° C., cooling being used when needed. The stated temperature is maintained for one hour after acrylate addition is complete.

An addition reaction takes place with one of the two isocyanate groups in the isophorone diisocyanate to produce a urethane monoisocyanate containing acrylate unsaturation.

EXAMPLE 2

One mole of tri(2-hydroxy polyoxypropyl)polysiloxane of average molecular weight 6000 and equivalent weight 2000 and which is 80% methyl substituted and 20% polyoxypropyl substituted (see note 1) is placed in a reaction vessel and heated to 60° C. Three moles of the Example 1 adducts are then added slowly while maintaining the temperature at 60° C. The reaction is continued until there remains no evidence of free NCO groups by infrared analysis. The product has a viscosity in the range of 10,000 to 15,000 centipoise.

Note 1—The Dow Corning product 1248 may be used.

The product of Example 2 is converted into an ultraviolet curable composition by the addition of 3% by weight of the photoinitiator diethoxy acetophenone (no photosensitizer is needed). The product is then filtered through a 1 micron filter to remove particles and is then stored, ready for use.

In use, the liquid coating composition is coated upon freshly formed glass filament of optical quality and the freshly coated filament is irradiated with ultraviolet light to cure the coating. This coating is normally overcoated, which forms no part of this invention. The prime coating, however, has a very low modulus of 300 psi and, at −60° C., the modulus only increased to 1100 psi.

EXAMPLE 3

Into a 1 liter round bottom flask fitted with stirrer, reflux condenser, Dean Stark water removal trap and a gas inlet tube are placed 500 grams (0.083 mol) of the polysiloxane used in Example 2, 18.2 grams (0.253 mole) of acrylic acid, 0.82 gram of beta-nitrostyrene, 0.2 gram of phenothiazine, 175 grams of heptane and 7.22 gram of 40% sulfuric acid. The flask is heated with stirring to reflux and nitrogen gas is supplied to blanket the contents of the flask. Heating with stirring is continued for about 6 hours and 19 minutes to collect 9 ml. of water in the trap. Then 0.14 gram of p-methoxyphenol are added and a vacuum of about 29 inches of mercury is applied at 45° C.-55° C. for 50 minutes to remove the heptane. The nonvolatile content obtained is 93.5%, the acid value is 4.1, and the viscosity is 486 cps at 25° C. This product is made into an ultraviolet-curable coating composition by adding 3% by weight of the photoinitiator diethoxyacetophenone. The product is then filtered through a 1 micron filter to remove any particles which may be present.

EXAMPLE 4

One mole (2400 grams) of tri(polyoxyethylene)-polysiloxane having an equivalent weight of 800 (Dow Corning 193 fluid may be used) is placed into a reaction vessel. Three moles (1014 grams) of the isocyanate adduct of Example 1 are added slowly while bringing the temperature to about 60° C. Heating or cooling are employed as necessary to maintin this temperature. The reaction is continued until there remains no free isocyanate groups by infrared analysis. 3% by weight of diethoxyacetophenone are added and the product is filtered to provide an ultraviolet curable coating for optical fiber.

EXAMPLE 5

Charge to a flask equipped with a stirrer, reflux condenser and a dropping funnel 3 moles (666 grams) of isophorone diisocyanate and 3 grams of dibutyl tin dilaurate. With stirring add 2 moles (4800 grams) of Dow Corning Q4-3667 (a polyoxyethylene terminated dimethyl siloxane polymer) over a period of about 2 hours while maintaining the temperature at about 65° C. After this addition is complete, maintain the temperature at about 65° C. for 1 hour. Then add 2 moles (232 grams) of 2-hydroxyethyl acrylate and 1.7 grams of phenothiazine and stir at 65° C. for one hour. The resultant product may be used at this concentration or it may be reduced with a liquid unsaturated diluent, such as 2-hydroxyethyl acrylate, typically in an amount of 5% by weight. For an ultraviolet curable coating composition add between 1% and 10% of an appropriate photoinitiator, like diethoxyacetophenone at 3% by weight concentration.

EXAMPLE 6

Charge to a suitably equipped reaction vessel two moles of isophorone diisocyanate and 10 grams of dibutyl thin dilaurate. Add to this mixture, slowly, one mole of a carboxypropyldimethyl terminated polydimethyl siloxane having a molecular weight of 5000 while maintaining the reaction temperature at about 60° C. The reaction is continued at about 60° C. until the acid number is essentially zero. At this point, add 2 moles of 2-hydroxyethyl acrylate at such a rate that any exotherm does not bring the temperature above 65° C. Continue the reaction at 60° C.-65° C. until no free NCO groups are evident using an IR spectroscopic analysis. The addition of 3% by weight of diethoxyacetophenone provides an ultraviolet curable coating composition.

EXAMPLE 7

Charge to a suitably equipped reaction vessel one mole of a glycidoxypropyldimethyl terminated polydimethyl siloxane having an average molecular weight of 5000, 5 grams benzyl dimethyl amine and 5 grams phenothiazine. Add to this mixture, while raising the temperature to 90° C.-100° C., 2 moles of acrylic acid over a period of about 2 hours. Continue the reaction at 90° C.-100° C. until the acid number has dropped to about 1. Then cool and discharge. The addition of 3% by weight of diethoxyacetophenone provides an ultraviolet curable coating composition.

EXAMPLE 8

Two moles of toluene diisocyanate are placed into a suitable reaction vessel. To this is added 5.7 grams of dibutyltindilaurate. The mixture is heated to 90° C. while one mole of a mercaptopropyldimethyl terminated polydimethylsiloxane having an average molecular weight of 2500 is added slowly. The reaction is continued at about 90° C. until there is no evidence of free SH groups by infrared spectrophotographic analysis. The reaction mixture is then cooled to 60° C. and two moles of hydroxyethyl acrylate and 3 grams of phenothiazine are added. The reaction is continued at 60° C.-65° C. until no free isocyanate groups remain as determined by infrared spectrophotographic analysis. This product is a radiation-curable coating composition and can be made sensitive to ultraviolet light by the addition of 3% by weight of diethoxyacetophenone.

EXAMPLE 9

One mole of polydimethylsiloxane, amino propyldimethyl terminated, of 4000 molecular weight is placed into a reaction vessel. Two moles of the isocyanate adduct of Example 1 is added rapidly, cooling if necessary to keep the temperature below 65° C. The reaction is continued at 60° C.-65° C. The reaction is continued at 60° C.-65° C. until there is no evidence of free NCO groups as determined by infrared spectrophotographic analysis. The addition of 3% by weight of diethoxyacetophenone provides an ultraviolet curable coating composition.

What is claimed is:

1. An optical glass fiber prime coated with an ultraviolet-cured coating composition having a modulus of elasticity at room temperature and at −60° C. below 3000 psi. said coating composition being a liquid, polyethylenically unsaturated, radiation-curable coating composition consisting essentially of an organic polysiloxane having from 2 to 6 reactive side chains each of which carry a functional group providing one reactive site which has been reacted to provide a single radiation-curable monoethylenically unsaturated side chain, there being about one such side chain for every 500 to 5,000 units of molecular weight.

2. A coated optical glass fiber as recited in claim 1 in which said organic polysiloxane is hydrocarbon substituted except for said functional groups.

3. A coated optical glass fiber as recited in claim 1 in which said monoethylenically unsaturated side chain provides acrylate or methacrylate functionality.

4. A coated optical glass fiber as recited in claim 1 in which said polysiloxane carries a reactive group selected from the group consisting of hydroxyl, amine, mercaptan, carboxyl and glycidyl functional groups.

5. A coated optical glass fiber as recited in claim 1 in which said reactive group is hydroxyl.

6. A coated optical glass fiber as recited in claim 5 in which said hydroxyl group is reacted with an acrylate or methacrylate carrying a single isocyanate group.

7. A coated optical glass fiber as recited in claim 6 in which said hydroxyl group is reacted with the reaction product of one mol of 2,4-toluene diisocyanate or isophorone diisocyanate with one mol of 2-hydroxy ethyl acrylate.

8. A coated optical glass fiber as recited in claim 1 in which said reactive group is selected to include a single reactive hydrogen atom.

9. A coated optical glass fiber as recited in claim 8 in which said reactive hydrogen atom is reacted with an acrylate or methacrylate carrying a single isocyanate group.

10. A coated optical glass fiber as recited in claim 4 in which said functional group carrying one reactive site is a saturated aliphatic radical containing, except for the reactive functional group, only carbon and hydrogen, or carbon, hydrogen and oxygen.

11. A coated optical glass fiber as recited in claim 2 in which the hydrocarbon substituent is selected from the group consisting of methyl, phenyl, and mixtures thereof.

12. A coated optical glass fiber as recited in claim 11 in which said functional group is connected to said polysiloxane by a carbon to silicon bond.

13. A coated optical glass fiber as recited in claim 1 further containing initiators and/or photosensitizers appropriate for rendering the composition curable by ultraviolet radiation.

14. An optical glass fiber as recited in claim 1 in which said prime coating consists essentially of organic polysiloxane having three carbinol groups and an average molecular weight of about 6000, said carbinol groups being reacted with organic diisocyanate and an hydroxyalkyl acrylate to provide a triacrylate polyurethane polysiloxane which is cured by ultraviolet radiation.

15. A prime coated optical glass fiber as recited in claim 14 in which said diisocyanate is selected from the group consisting of 2,4-toluene diisocyanate and isophorone diisocyanate and said hydroxyalkyl acrylate is 2-hydroxyethyl acrylate.

16. A prime coated optical glass fiber as recited in claim 14 in which said diisocyanate and said hydroxy acrylate are prereacted to form an acrylate monoisocyanate which is then reacted with the carbinol groups of said polysiloxane.

17. A prime coated optical glass fiber as recited in claim 14 overcoated with a topcoat to protect the prime coat from abrasion and hydrolysis.

18. A prime coated optical glass fiber as recited in claim 17 in which said polysiloxane is substituted only by methyl groups in addition to said carbinol groups.

* * * * *